Jan. 5, 1971  C. F. BROTHERS ET AL  3,553,602
TEMPERATURE STABILIZED PIEZOELECTRIC CRYSTAL
TRANSDUCER AND OSCILLATOR
Filed June 27, 1968
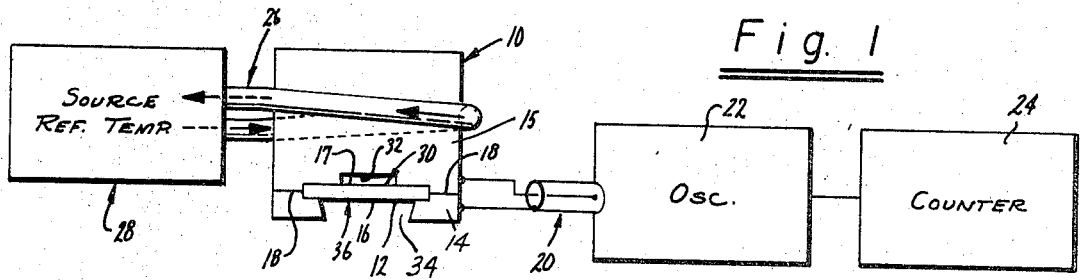
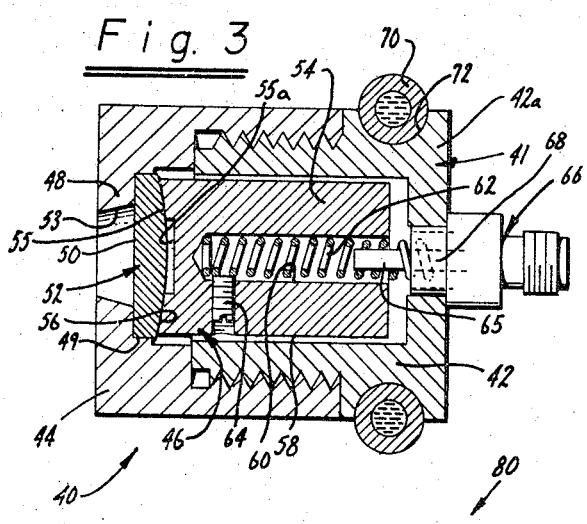
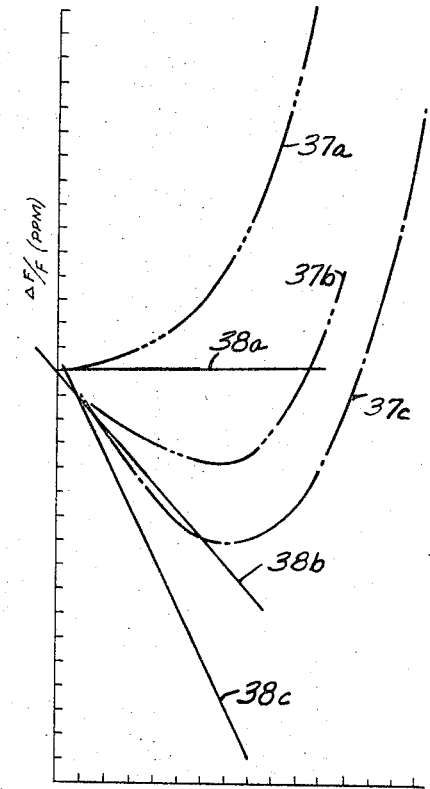
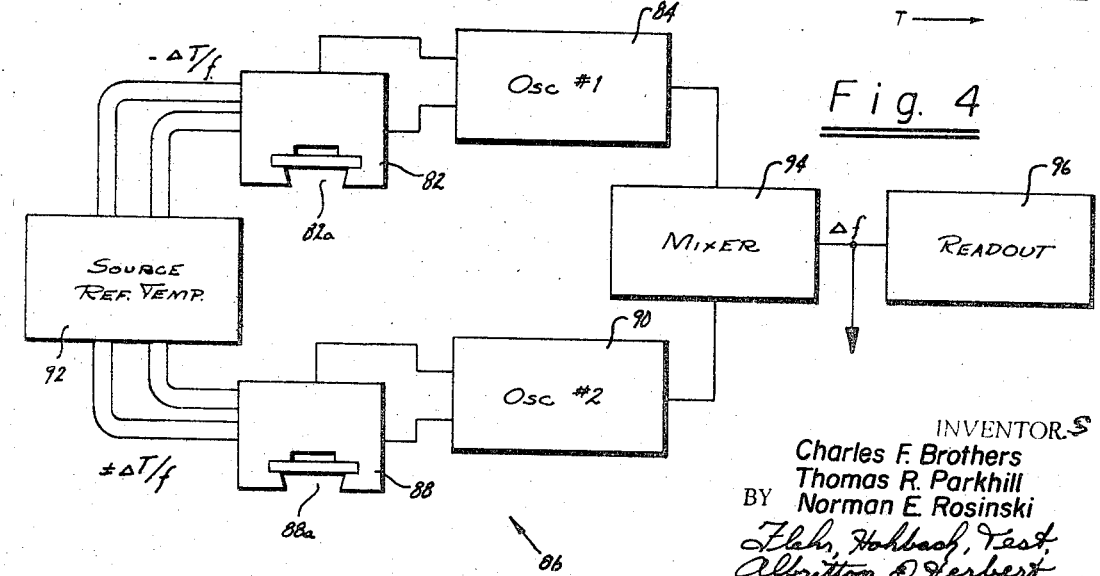
INVENTORS
Charles F. Brothers
Thomas R. Parkhill
Norman E. Rosinski
BY
Flehr, Hohbach, Test,
Albritton & Herbert
Attorneys United States Patent Office 3,553,602
Patented Jan. 5, 1971

3,553,602
TEMPERATURE STABILIZED PIEZOELECTRIC
CRYSTAL TRANSDUCER AND OSCILLATOR
Charles F. Brothers, Menlo Park, Thomas R. Parkhill,
Redwood City, and Norman E. Rosinski, Cupertino,
Calif., assignors to The Perkin-Elmer Corporation,
Norwalk, Conn., a corporation of New York
Filed June 27, 1968, Ser. No. 740,691
Int. Cl. G01k 7/04; H01v 7/00; H03b 5/32
U.S. Cl. 331—40                                    12 Claims

ABSTRACT OF THE DISCLOSURE

A crystal transducer and an oscillator circuit is disclosed in which a temperature gradient is applied between the crystal faces. One face is held at a predetermined reference temperature while the temperature of the other face varies with the environment to which it is exposed. For this arrangement a linear relationship exists between the temperature gradient and the natural resonance of the crystal. Applications as temperature sensor, microbalances and particular modes of operating the transducer are disclosed.

BACKGROUND OF THE INVENTION

This invention relates to piezoelectric crystal transducers and more particularly to such transducers as are used in crystal oscillator circuits as frequency controllers, microbalances, or environmental condition (pressure, moisture, etc.) sensors and to methods for their operation.

Heretofore, such transducer oscillator circuits have been subject to nonlinear variations or shifts in frequency as a function of temperature. In general, a family of nonlinear S-curves can be drawn to express such shifts as a function of the particular angles of crystal cut. One of the curves is then used to correct the crystal operating frequency in accordance with the operating temperature parameter. Examples and a discussion of such S-curves and corrections are discussed in the article by Rudolph Beckmann in the Proceedings of the IRE, November 1966, pages 1600 to 1607.

In order to specify the manner in which the frequency varies, in accordance with the nonlinear curves just mentioned, it has been customary to maintain the entire crystal in a well defined thermal environment or constant temperature bath. Such an environment is difficult to achieve, especially in applications where it is desired to expose one face of the crystal to a physical effect to be measured or investigated. In the case of temperature measurements, the entire crystal has had to be brought to a new temperature equilibrium, restricting its usefulness for that purpose. There is, therefore, a need for a new and improved crystal transducer.

SUMMARY OF THE INVENTION AND OBJECTS

In general, it is an object of the present invention to provide an improved crystal transducer which will overcome the above limitations and disadvantages.

Another object of the present invention is to provide an improved crystal transducer of the above character which has a linear frequency response with respect to temperature over a significantly larger range of temperatures than heretofore possible.

Another object of the invention is to provide a crystal transducer of the above character which is especially adapted for use in applications where an exposed face of the crystal is to be subjected to an external influence such as mass loading or temperature change.

Another object of the invention is to provide a crystal transducer of the above character which can be utilized in an oscillator circuit to provide a highly sensitive temperature measuring device.

In general, the present invention is predicated upon the discovery that when one face of a crystal (quartz AT cut) is held at a constant temperature and a differential or varying temperature applied to the other face, a linear change in the operating frequency is produced. This is contrary to the well known nonlinear response resulting from whole body changes in crystal transducer temperature. The linear relationship is found in the present invention to vary from negative to positive effect and a particular AT cut can be found for which the slope is approximately zero. This particular cut is automatically temperature compensated over a wide range of temperature gradients for a given reference temperature and permits one face of a crystal to be exposed to varying conditions from the environment, while isolating the effect of the environment temperature on the operating frequency. By way of an example, a microbalance useful in detecting the amount of a vacuum-deposited thin film material is disclosed and is substantially nonresponsive to temperature changes over a wide range while having an excellent and direct response to the thickness of a deposited coating.

Another example of the use of the present invention relates to temperature sensing device in which direct use is made of the linear temperature response for the purpose of measuring temperature changes. Particularly, a temperature measuring device is disclosed in which the outputs of unbalanced crystal transducer circuits of the present invention are combined to produce a difference frequency which increases linearly as a function of temperature change.

These and other objects and features of the invention will become apparent from the following description and claims when taken in conjunction with the accompanying drawings.

DESCRIPTION OF THE FIGURES

FIG. 1 is a schematic illustration, partially in block diagram form, of apparatus including a crystal transducer and oscillator circuit constructed in accordance with the invention.

FIG. 2 is a set of graphs depicting frequency versus temperature behavior for various crystals used in the apparatus of FIG. 1.

FIG. 3 is an elevational view partly broken away and partly in section of a crystal transducer structure constructed according to the invention.

FIG. 4 is a schematic illustration partly in block diagram form of temperature sensing apparatus using crystal transducers and oscillator circuits constructed in accordance with the invention.

DETAILED DESCRIPTION

Referring now to FIG. 1, there is shown the general arrangement of crystal transducer and oscillator circuit of the invention which consists of a crystal transducer 10 which supports a generally planar crystal 12 between support blocks 14, 15. These blocks also serve the function of electrical connectors to film electrodes 16, 17 formed on the lower and upper faces of crystal 12 and are therefore electrically insulated from each other by a suitable means such as an insulating layer 18. Blocks 14, 15 are connected by suitable conductor means such as coaxial cable 20 to an oscillator circuit 22 whose operating frequency is determined by the resonant frequency of oscillation of the crystal 12. A counter 24 or other suitable readout device such as an oscilloscope, is connected to the oscillator output to indicate changes in the output frequency.

Block 15 is thermally coupled, as by being wrapped, to piping 26 which is connected to a source 28 of fluid at a predetermined reference temperature to thereby maintain it at reference temperature. The lower end of block 15 is in direct thermal contact with peripheral portions of the surface 30 of crystal 12 and thereby serves to maintain that surface at the reference temperature.

Crystal 12 is preferably an AT cut quartz type adapted to vibrate in the third overtone shear mode wherein vibrations are localized in a central region. Accordingly, block 15 is provided with a recess 32 above the central region of surface 30 and block 14 is provided with an aperture 34 which exposes a substantial portion of the other surface 36, recess 32 and aperture 34 serving to provide a mounting in which the overtone vibration is unimpeded while the crystal is adequately mounted and its upper surface 30 is in a thermally controlled environment.

As used herein, a generally planar crystal includes not only those having spaced parallel planar faces but also plano-convex or other configurations which can take the form of a shell or plate-like structure. In fact, a plano-convex crystal is preferred since its vibrations are enhanced in a central region and are not so easily damped out by the mounting blocks as an exactly plane surfaced crystal.

Surface 36 of crystal 12 is exposed to whatever environmental condition it is desired to monitor and is permitted to take temperature values other than the reference value. Thus, the exposed surface can serve as the monitoring surface for incident heat (by radiation, for example) as well as the monitoring face for surface loading effects such as vacuum deposits of mass. When the frequency shift of the crystal oscillator is used to measure mass loading, the transducer 10 can be used in applications such as thin film thickness measurement, water vapor monitoring, microbalance studies of surface physics, and many others. In these applications the temperature of the surface 36 takes values which approach that of the environment to which it is exposed and, in general, a temperature gradient is developed across the crystal. This temperature gradient is found to produce a linear change in the frequency of operation of the crystal transducer and permits the construction of an oscillator circuit which can be used as a directly calibrated device either for temperature measurement or for measurements of other physical phenomenon to which the exposed surface may be sensitive with negligible or easily applied temperature compensation.

For specific AT quartz crystals, FIG. 2 shows dashed graphs or curves 37a, b, c, d depicting the generalized frequency temperature functions for slightly different angles of cut and operating in the third overtone shear modes. Each of the curves is labeled with the difference from reference cut, taken at 35°0'.

The solid graphs or lines 38a, b, c represent the frequency temperature functions for the corresponding crystal cuts using temperature difference technique. It is easily seen that these functions have straight line character with uniform slope and represent linear relationship between the temperature and frequency variables. Thus, although the crystals behave in the classical nonlinear manner and according to the well known family of S-curves when heated uniformly, they are found to follow a linear law when heated differentially with a temperature gradient. It is also found that the angle or slope of the lines 38a–d with respect to the temperature axis is a function of the original angle of cut of the crystal and, to that extent, crystal cuts with a high degree of temperature sensitivity or nearly negligible temperature sensitivity (under a temperature gradient) are found to exist.

FIG. 3 is a detailed view of an embodiment of the transducer 40 constructed according to the invention and in general correspondence with the arrangement of FIG. 1. Transducer 40 is suitable for use as a microbalance to measure thin film deposits, or as a temperature sensor. Transducer 40 consists of a housing 41 including a hollow cylindrical base 42 closed by a wall 42a at one end and by a cap 44 having a recess therein for forming a substantially enclosed region 46. The cap and base are secured together by suitable threaded surfaces formed on their outer and inner lateral surfaces respectively. Cap 44 is provided with a rim 48 for receiving and supporting the periphery 49 and the immediately adjacent portions of one surface 50 of a crystal 52. Rim 48 terminates in a central aperture 53 which exposes the central portion of surface 50 and makes it available to environmental influences without the housing.

Means including a cylindrical plunger 54 having a shallow recess 55a at one end 55 is captured in region 46 so that end 55 is urged toward the surface 56 of crystal 52 to engage the periphery thereof but to leave the central portion of surface 56 free to vibrate within recess 55a. The plunger is made of aluminum and is provided with an insulating layer on its lateral surface 58 to electrically insulate it from the remainder of housing 41. The other end of plunger 54 is provided with a well 60 into which a spring 62 is seated and held with a set screw 64. Spring 62 also serves as a conductive member for making contact between the plunger and the central conductor 65 of a coaxial connector 66, the outer conductor 68 of which is press fit into engagement with end wall 42a of the base. In this way, one electrical contact with crystal 52 is made from the outer conductor of the coaxial connector through the base and cap to surface 50 while the other contact is made through conductor 65, spring 62, and plunger 54.

Means is provided for maintaining a controlled temperature at the inner surface 56 of the crystal 52 and includes tubing 70 which encircles base 42 and is, for example, made of thermally conductive metal such as copper and is silver soldered within an annular recess 72 formed about base 42. Tubing 70 is connected to a suitable source of fluid which is maintained at a predetermined temperature suitable for establishing the reference temperature on crystal face 56. A heat conductive but electrically insulative material, such as helium gas, fills the space within base 42 to thereby provide enhanced thermal exchange between it, the plunger 54 and surface 56 of the crystal.

The transducer of FIG. 3 can be used in the circuit of FIG. 1 as a probe or other sensing transducer to measure temperature or mass deposits. For the purpose of measuring mass deposits, it is desirable to eliminate the effects of temperature as much as possible and this is achieved by selecting a cut of crystal for which the linear response to differential temperature across the crystal has a slope as near to zero as possible. On the contrary, for measurement for temperature, a large slope is desirable in order to provide greater sensitivity.

FIG. 4 illustates a circuit utilizing a pair of transducers of the type shown in FIG. 3 and which utilizes their properties to produce an audio output frequency which is directly related t the variable being measured. Thus, there is provided a first oscillator circuit 80 including crystal transducer 82 connected to an oscillator 84 and a second oscillator circuit 86 including a crystal transducer 88 connected to oscillator 90. Both crystal transducers 82, 88 are connected to a common temperature source 92 which serves to establish a reference temperature for both of the transducers. The outputs of oscillators 84, 90 are fed into the inputs of suitable mixer stage 94 where in they are heterodyned to produce an output difference frequency which is directly investigated or converted to DC by a readout stage 96.

For the case of differential temperature measurements, let it be assumed that the crystals are provided with opposite sensitivity or response slope than the other. Say, for example, transducer 82 has a slope of —2 p.p./°C. while oscillator 88 has a response of +2 p.p.m./°C. For some temperature, the output frequencies of the oscillators will diverge, and, when mixed, will produce a difference frequency at stage 94 which is in the audiofrequency range having a sensitivity of about 4 p.p.m./°C. When the difference frequency is measured, a change in temperature of about 0.05° C. is detected for a difference of one cycle per second in frequency.

The same general scheme shown in FIG. 4 can also be used to produce a temperature insensitive device by selecting both of the crystals to have approximately the same temperature sensitivity. That is to say, each could be selected to have a sensitivity of —2 p.p.m./°C. If the exposure aperture 82a of crystal transducer 82 is masked to prevent the deposits thereon while the other aperture 88a is exposed to the environment, the output audiofrequency will reflect only the change in vibrating frequency of the exposed crystal and the effect caused by changes in temperature which may have been encountered will be balanced out or cancelled because both crystals are linearly affected in the same way.

We claim:

1. A method of causing the operating frequency of a crystal controlled oscillator to vary linearly with temperature comprising the steps of maintaining one surface of the crystal of said oscillator at a predetermined temperature while simultaneously varying the temperature of the other surface to cause a temperature gradient to develop between the crystal surfaces, said temperature gradient being varied as said temperature on said second surface is varied thereby causing a frequency shift in the operating frequency of said crystal controlled oscillator which varies linearly as a function of said varying temperature gradient.

2. A crystal transducer for use in an oscillator circuit comprising a crystal, means for supporting said crystal while permitting the same to vibrate and including an aperture for exposing one surface of said crystal to an environmental condition to sense the same, means making electrical connections to the electrically operative surfaces of said crystal, means for maintaining another surface of said crystal at a predetermined reference temperature whereby a temperature gradient is developed across portions of said crystal, said gradient thereby causing a linear frequency shift of its natural operating frequency with respect to changes in said temperature gradient.

3. A crystal transducer as in claim 2 wherein said crystal comprises an AT cut quartz plate having opposed generally parallel surfaces between which said temperature gradient is developed.

4. A crystal transducer as in claim 2 wherein said crystal comprises an AT cut quartz plate selected to have a frequency shift with respect to temperature gradient across its faces the slope of which is approximately zero so that the effects of environmental conditions to which portions of the crystal are exposed are independent from the effects of temperature.

5. A crystal transducer as in claim 2 wherein said crystal comprises an AT cut quartz plate selected to have a large frequency shift with respect to temperature gradient across its faces so that said transducer linearly responds to temperature changes of said environment which are applied to cause said temperature gradient.

6. In crystal controlled sensing apparatus, first and second crystal controlled oscillator circuits including first and second crystal transducers, each of said transducers comprising a crystal having active surfaces including certain surfaces adapted to be connected to an electrical circuit, means for supporting said crystal while permitting the same to vibrate and including an aperture for selectively exposing at least one surface of said crystal to an environmental condition to sense the same, means for making electrical connections to the electrically active surfaces of each of said crystals, means for maintaining at least one surface of said crystals at a predetermined reference temperature, temperature gradients being developed across said crystal causing linear frequency shifts in its natural oprating frequency with respect to changes of said temperature gradient, a mixer stage having inputs for receiving the output of each of said first and second oscillator circuits, said mixer stage serving to heterodyne said oscillator output signals to produce a difference frequency indicative of differences in the environmental condition to which each of said crystals is exposed.

7. Apparatus as in claim 6 wherein each of said first and second crystals are selected to have the same temperature dependence, one of said crystals being selectively exposed to an environment to be measured while the other crystal is subjected only to the temperature condition of said environment whereby effects of temperature are cancelled out from the output of said mixer stage.

8. Crystal controlled sensing apparatus as in claim 6 wherein said first and second crystals are selected to have gradient temperature sensitivity of differing slope so that exposure of said surfaces of said crystals to an environmental temperature condition differing from said reference temperature produces a linear divergence in the output of said oscillator circuits which is directly proportional to the temperature difference between said reference temperature and the temperature of said environment.

9. Apparatus as in claim 8 wherein the slope of said gradient temperature sensitivity of said crystals is opposite in sign.

10. A crystal oscillator transducer comprising a piezoelectric, generally planar crystal having first and second spaced surfaces, a housing including means therein for supporting said crystal by one surface thereof and for making electrical contact therewith, said housing having an aperture therein for exposing said one surface of said crystal to an external environment for sensing the same, means for urging the other surface of said crystal into engagement within the means for supporting said first surface to form a mounting therewith in which said crystal is permitted to vibrate, said last named means including means for making electrical contact with said other surface of said crystal, means for electrically isolating said housing and said urging means, means for maintaining said other surface of said crystal at a predetermined temperature while permitting the temperature of said exposed surface to vary with the environment to which it is exposed.

11. A crystal transducer as in claim 10 wherein said crystal is an AT cut quartz plate adapted to vibrate in the third overtone mode.

12. A crystal transducer as in claim 10 wherein said crystal is plano-convex.

References Cited

UNITED STATES PATENTS

| | | | |
|---|---|---|---|
| 2,456,811 | 12/1948 | Blackburn | 331—66X |
| 3,201,621 | 8/1965 | Milner | 310—8.9 |
| 3,355,949 | 12/1967 | Elwood et al. | 331—65X |
| 3,423,609 | 1/1969 | Hammond | 310—8.9X |

ROY LAKE, Primary Examiner

S. H. GRIMM, Assistant Examiner

U.S. Cl. X.R.

73—362; 310—8.9; 331—41, 66, 158, 176